(12) United States Patent
Lonner et al.

(10) Patent No.: US 10,239,679 B2
(45) Date of Patent: *Mar. 26, 2019

(54) STAY-FRESH FOOD CONTAINER (71) Applicant: Guac-Lock, LLC, White Plains, NY (US)

(72) Inventors: Sharon Lonner, Scarsdale, NY (US); Jane Caplan, White Plains, NY (US); Ran Lerner, New York, NY (US)

(73) Assignee: Guac-Lock LLC, White Plains, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/247,573

(22) Filed: Aug. 25, 2016

(65) Prior Publication Data
US 2017/0036842 A1     Feb. 9, 2017

Related U.S. Application Data

(63) Continuation of application No. 14/514,903, filed on Oct. 15, 2014, now abandoned.
(Continued)

(51) Int. Cl.
| | | |
|---|---|---|
| *B65D 21/08* | (2006.01) | |
| *B65D 81/24* | (2006.01) | |
| *B65D 45/16* | (2006.01) | |
| *B65D 51/16* | (2006.01) | |
| *A47G 23/06* | (2006.01) | |
| *A47J 47/02* | (2006.01) | |
| *B65D 43/02* | (2006.01) | |

(Continued)

(52) U.S. Cl.
CPC ......... *B65D 81/24* (2013.01); *A47G 23/0633* (2013.01); *A47J 47/02* (2013.01); *B65D 21/086* (2013.01); *B65D 43/02* (2013.01); *B65D 45/16* (2013.01); *B65D 47/32* (2013.01); *B65D 51/1683* (2013.01); *B65D 53/02* (2013.01)

(58) Field of Classification Search
CPC ............ B05B 11/0037; B05B 11/3056; B05C 17/00576; B65D 21/068; B65D 21/08; B65D 21/083; B65D 21/086; B65D 51/1672; B65D 83/0005; B65D 83/0072; B65D 83/386
USPC ............ 206/91; 220/23.88, 324, 367.1, 4.26, 220/4.29, 4.32, 495.04, 529, 530, 532, 220/534, 544, 573.1, 578, 625, 629–630, 220/720, 745, 8; 222/160, 162, 319, 386, 222/387, 405, 524, 562, 101; 426/111–12, 118, 131
See application file for complete search history.

(56) References Cited

U.S. PATENT DOCUMENTS 3,648,873 A * 3/1972 Grobbel .................. A61J 9/001
                                             215/11.3
4,203,353 A * 5/1980 Burnham ............... F16J 15/324
                                             92/159

(Continued)

*Primary Examiner* — Anthony D Stashick
*Assistant Examiner* — Kaushikkumar A Desai
(74) *Attorney, Agent, or Firm* — Mintz, Levin, Cohn, Ferris, Glovsky and Popeo, P.C.

(57) ABSTRACT

A container for storing a food product includes a receptacle and a plunger slidably movable along an inner wall of the receptacle. The plunger includes a support surface for the food product and a seal configured to form a seal between the support surface and the inner wall. A rounded lid with an apex is configured to be sealingly coupled to the receptacle. The lid includes a vent located at the apex.

20 Claims, 13 Drawing Sheets

Related U.S. Application Data

(60) Provisional application No. 61/906,056, filed on Nov. 19, 2013.

(51) Int. Cl.
    *B65D 47/32*     (2006.01)
    *B65D 53/02*     (2006.01)

(56) References Cited

U.S. PATENT DOCUMENTS

| | | | | |
|---|---|---|---|---|
| 5,033,631 A * | 7/1991 | Nightingale | A61J 9/001 | 215/11.1 |
| 5,226,563 A * | 7/1993 | Coggiola | B05B 11/0027 | 222/153.01 |
| 5,524,783 A * | 6/1996 | Popoff | A61J 9/001 | 215/11.1 |
| 5,540,557 A * | 7/1996 | Carson | B65D 81/2023 | 141/65 |
| 5,547,107 A * | 8/1996 | Boiardi | B65D 83/0005 | 222/1 |
| 6,026,685 A * | 2/2000 | Weterrings | G01F 19/00 | 220/8 |
| 6,138,848 A * | 10/2000 | Fermo | A61J 9/00 | 215/11.1 |
| 6,302,286 B1 * | 10/2001 | Witherspoon | A61J 11/008 | 215/11.1 |
| 2007/0012696 A1 * | 1/2007 | Levie | B65D 21/086 | 220/8 |

\* cited by examiner

STAY-FRESH FOOD CONTAINER

CROSS-REFERENCE TO RELATED APPLICATIONS

This application claims priority to co-pending U.S. Provisional Patent Application No. 61/906,056 filed on Nov. 19, 2013, the entire content of which is incorporated herein by reference.

FIELD OF THE INVENTION

The invention relates to a container for preserving the freshness of food, and more particularly to a container with a moveable piston that removes air from the container by decreasing the effective volume of the container.

BACKGROUND

Many products, particularly food products, lose their freshness through age and oxidization. Even when these products are stored in generally air-tight containers, the air trapped within the container may actively participate in the oxidation process. Aging and decay is particularly rapid in fruit- and vegetable-based items due to high contents of oxygen-sensitive nutrients. For example, guacamole discolors within hours when in contact with open air, and rapidly reaches the end of its shelf life. Accordingly, a need exists for a container that preserves the freshness of food or other oxygen-sensitive products.

SUMMARY

In one embodiment, a container for storing a food product includes a receptacle having a first open end and an opposing second open end. A piston is configured for at least partial disposal within the receptacle and includes a surface to support the food product. A lid is securable to the first open end of the receptacle. An engaging member is engageable through the second open end of the receptacle with the piston for movement therewith. Upon movement of the engaging member the surface is slidable within the receptacle.

In one embodiment, a container for storing a food product includes a receptacle and a plunger slidably movable along an inner wall of the receptacle. The plunger includes a support surface for the food product and a seal configured to form a seal between the support surface and the inner wall. A rounded lid with an apex is configured to be sealingly coupled to the receptacle. The lid includes a vent located at the apex.

In one embodiment, a method of storing a food product includes placing the food product on a surface of a plunger at least partially disposed within a receptacle. The method also includes coupling a lid having a curved portion with an apex and a sealable vent hole at the apex to an end of the receptacle. The method further includes displacing the plunger toward the apex.

Other features and aspects of the invention will become apparent by consideration of the following detailed description and accompanying drawings.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting.

DETAILED DESCRIPTION

Figure 1:
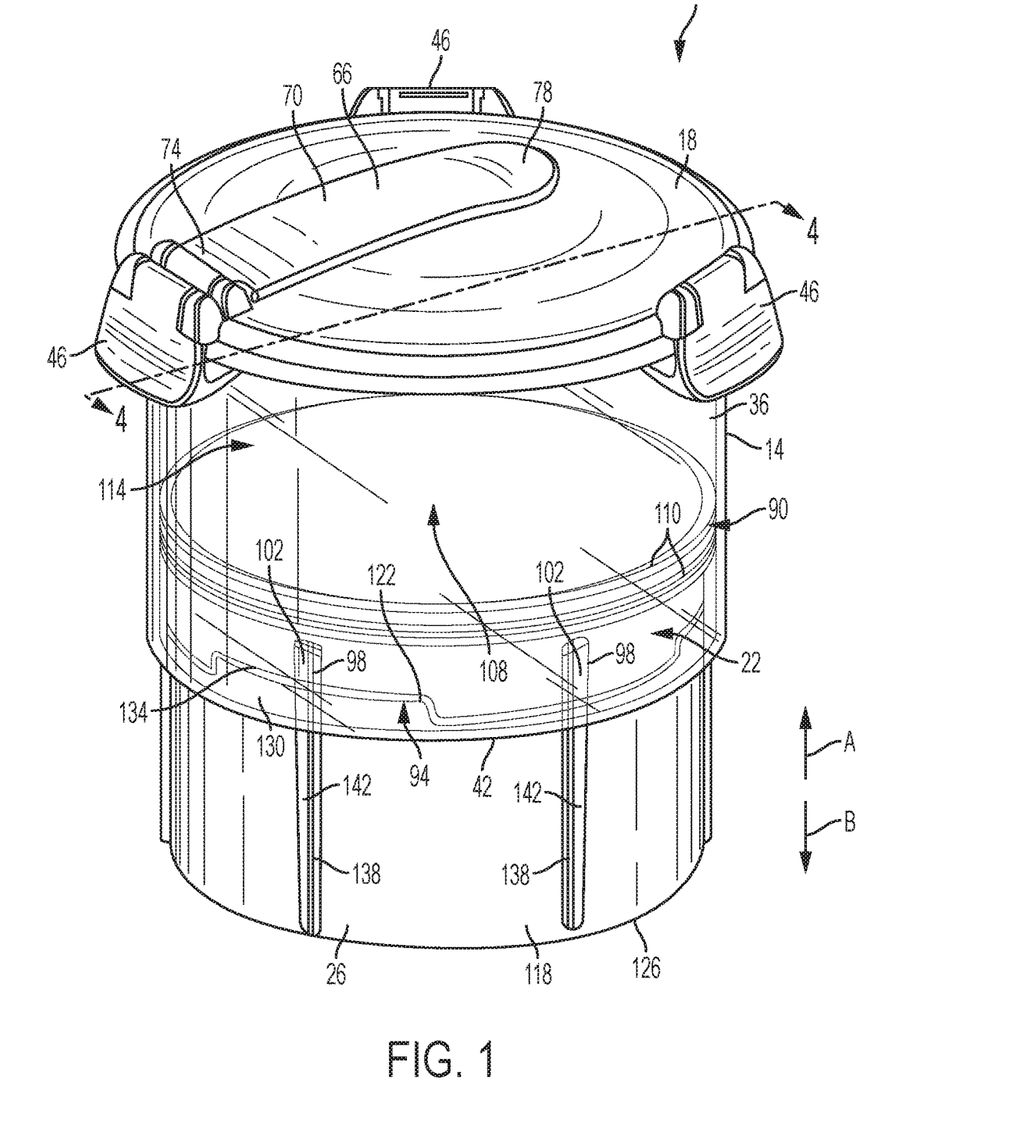
FIG. 1 is a perspective view of a food storage container according to an embodiment of the invention.

FIG. 1 illustrates a food storage container 10 for storing food products, in particular oxygen-sensitive food products, such as guacamole or other dips, spreads, or sauces. The container 10 includes a receptacle 14, a lid 18, a plunger or piston 22, and a base or engaging member 26.

Figure 3:
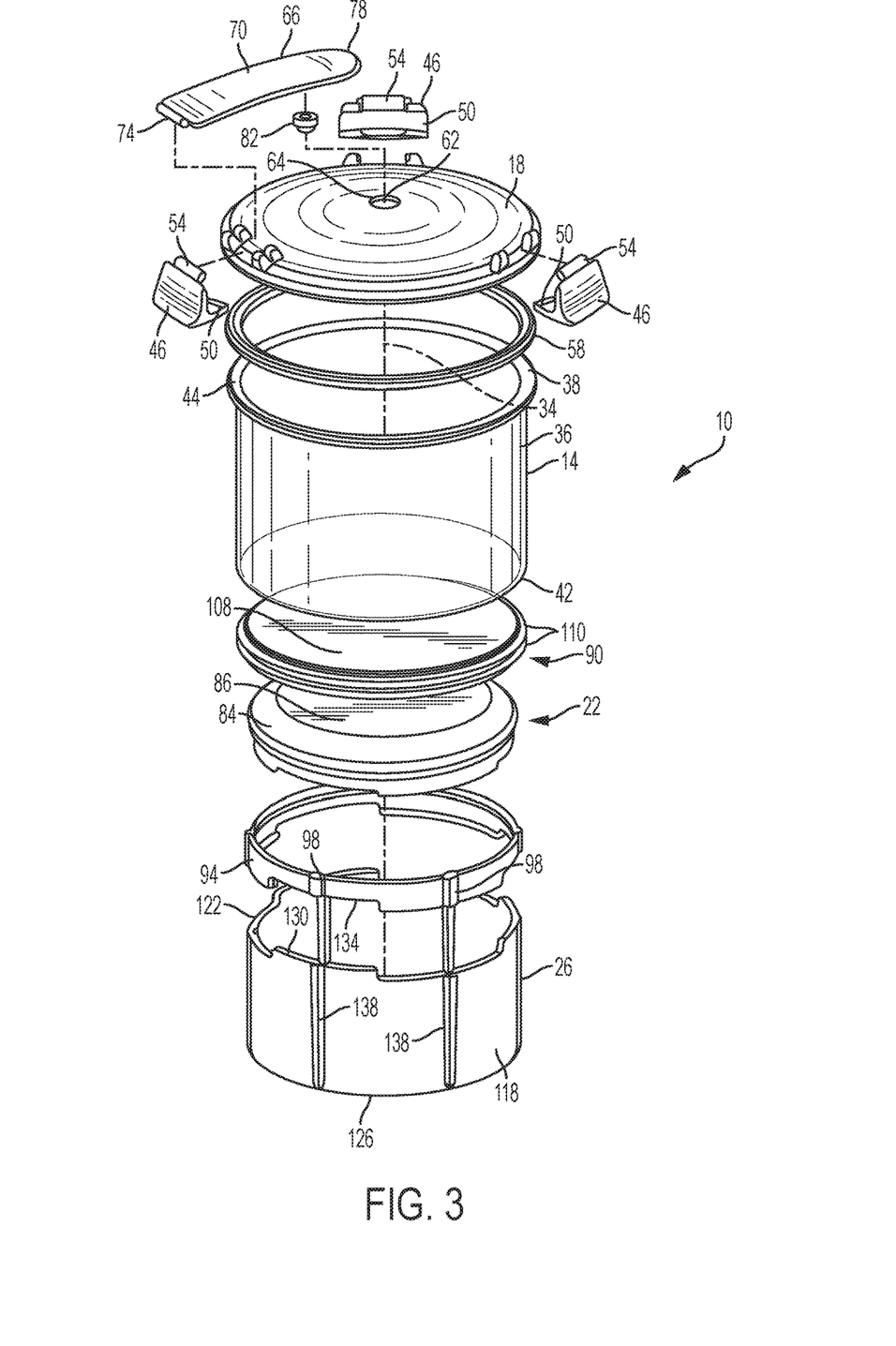
FIG. 3 is an exploded view of the food storage container of FIG. 1.

With further reference to FIG. 3, the receptacle 14 defines a longitudinal axis 34 and includes an inner sidewall 36 and first and second open ends 38, 42. The illustrated receptacle 14 is in the form of a cylinder, but in an alternative embodiment could be based on a cross-sectional shape other than circular, e.g., oval, rectangular, etc. A peripheral flange 44 is integrally formed with or otherwise secured to the receptacle 14 at the first or upper end 38. The receptacle 14 is made of food-safe plastic and is substantially transparent. In other embodiments, the receptacle 14 may be made of other materials, such as glass or ceramic.

Figure 4:
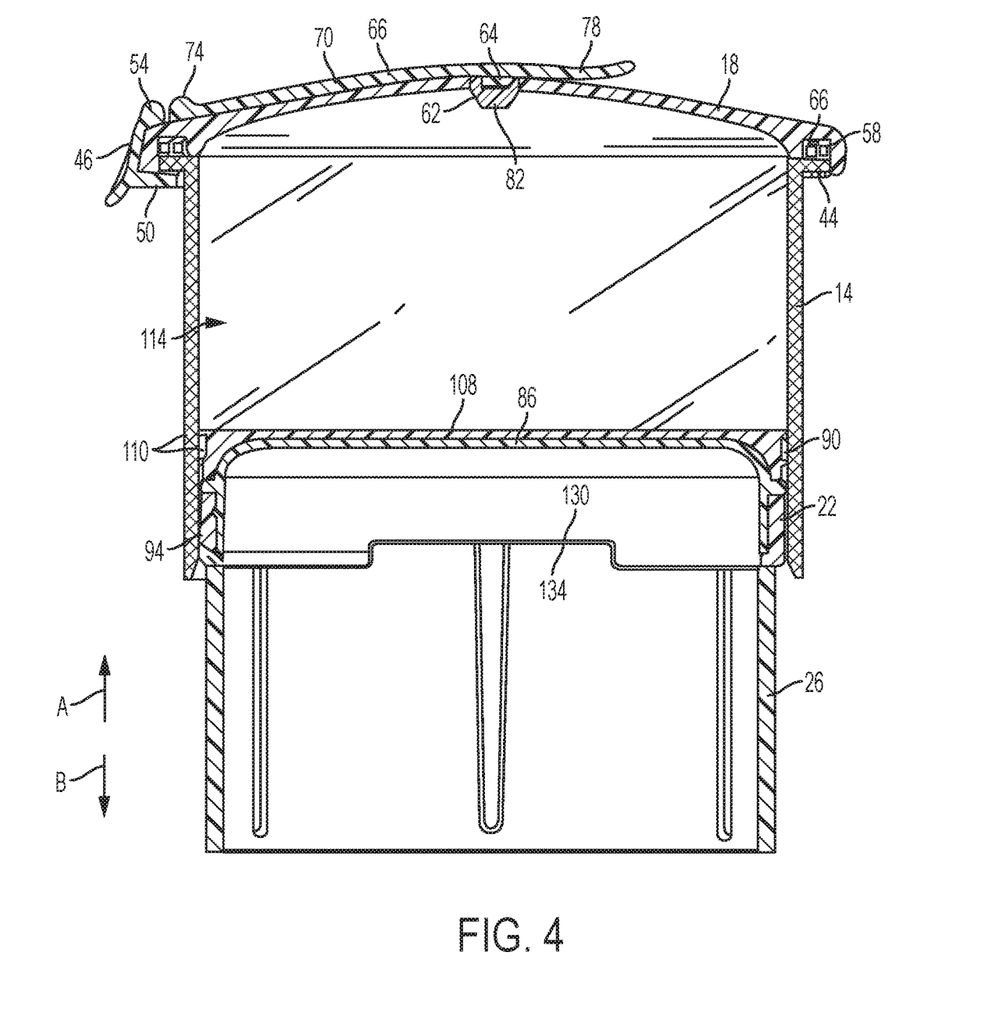
FIG. 4 is a cross-sectional view taken along line 4-4 in FIG. 1.

The lid 18 is removably coupled to the first end 38 of the receptacle 14 by a plurality of clamps or latches 46 positioned around the periphery of the lid 18. Each of the latches 46 includes a hook portion 50 for engaging the peripheral flange 44 and an attachment portion 54 rotatably coupled to the lid 18. Referring also to FIG. 4, an annular sealing ring 58 is seated within a channel 60 formed in the underside of the lid 18 and dimensioned to circumferentially contact at least a portion of the flange 44. As illustrated, the lid 18 includes three equally-spaced latches 46. In other embodiments the lid 18 may include four or more latches of equal or variable spacing. In yet other embodiments, the lid 18 may be removably coupled to the first end 38 in other ways (e.g., using a snap fit or a threaded connection). Alternatively, the lid 18 may be pivotally coupled to the receptacle 14.

Figure 2:
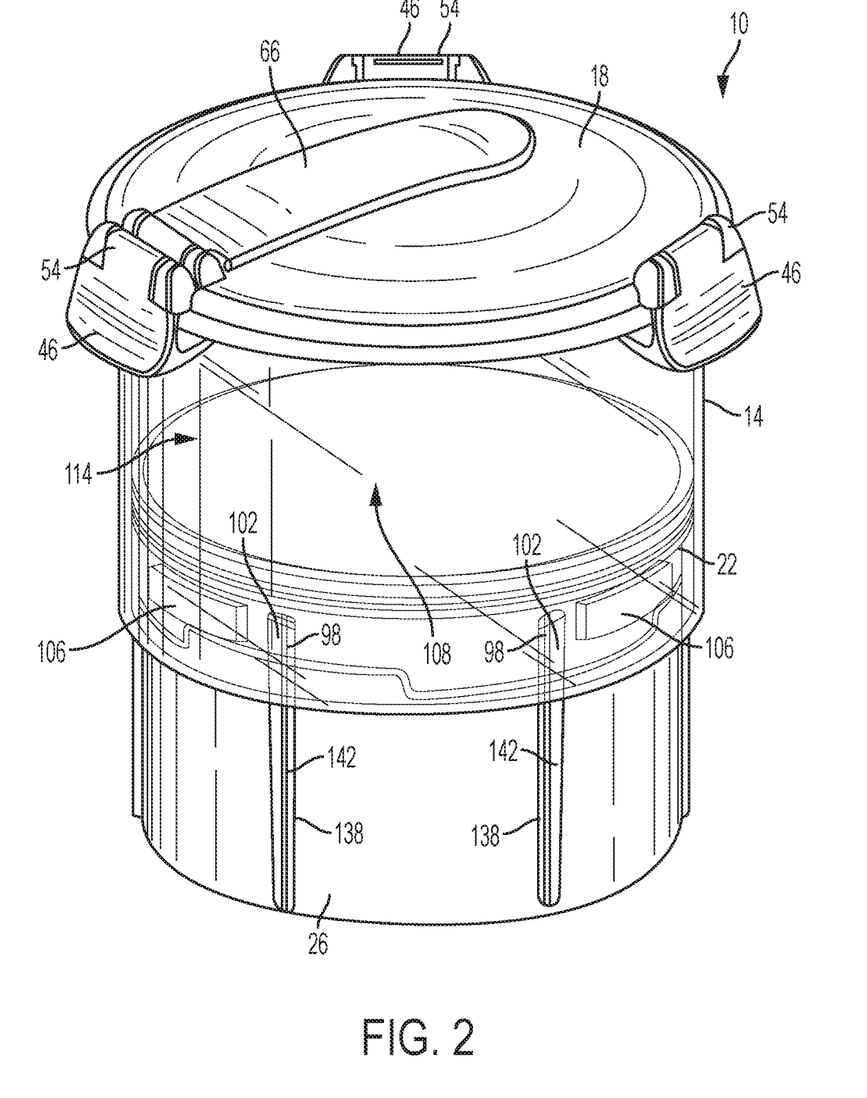
FIG. 2 is a perspective view of a food storage container according to another embodiment of the invention.

With continued reference to FIGS. 3 and 4, the lid 18 is uniformly curved or rounded and includes a vent 62 centrally located at an apex 64 of the curved or rounded portion of the lid 18. A cap 66 is provided to selectively seal the vent 62 from the external environment and includes a lever 70 having a first end 74 pivotally coupled to the lid 18 adjacent an attachment portion 54 of one of the latches 46 and a second end or gripping portion 78 supporting a sealing plug 82 formed for insertion into the vent 62. The sealing plug 82 can be snap-fit onto the gripping portion 78 and constructed of acrylonitrile butadiene styrene (ABS) or polypropylene. In other embodiments, the sealing plug 82 can be overmolded and constructed of, for example, nylon, The piston 22 is slidably disposed within the receptacle 14 and includes a main body 84 made of nylon having an upper surface 86, a peripheral seal 90, and a receiving portion 94 made of polypropylene opposite the upper surface 86. Although shown as separate parts in FIGS. 3 and 4, the main body 84 and the receiving portion 94 may be integrally formed together as a single nylon part. In the illustrated embodiment, axially-extending strips or ridges 98 are disposed around the perimeter of the receiving portion 94 and project radially to define contact surfaces 102 (FIG. 3), which are dimensioned to contact the inside surface of the receptacle 14. Referring to FIG. 2, the contact surfaces 102 may include a friction-enhancing material, coating or surface treatment to increase frictional interaction with the receptacle 14. Optionally, the receiving portion 94 may include additional friction-enhancing portions 106, such as plastic, rubber, or foam strips, studs, or raised points for the same purpose.

Referring to FIGS. 3 and 4, the seal 90 includes an upper support surface 108 and a pair of peripheral wiper seals 110 offset from one another along the longitudinal axis 34. The seal 90 is overmolded on or otherwise secured to the main body 84 so that the upper surface 108 of the seal 90 spans across the upper surface 86 of the body 84. As such, the upper surface 108 of the seal 90 defines the top surface of the piston 22. Alternatively, if the main body 84 and the receiving portion 94 are formed as one part, the seal 90 is overmolded directly thereon.

Figure 4A:
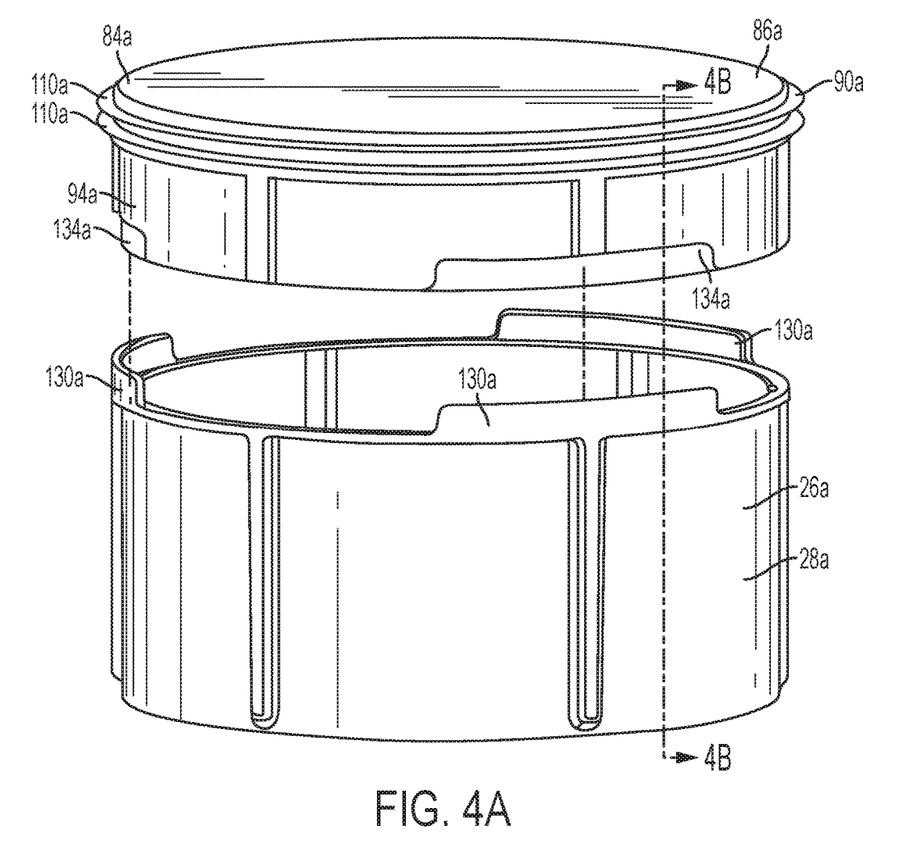
FIG. 4A is an exploded view of an alternative plunger and base for the food storage container of FIG 1.
Figure 4B:
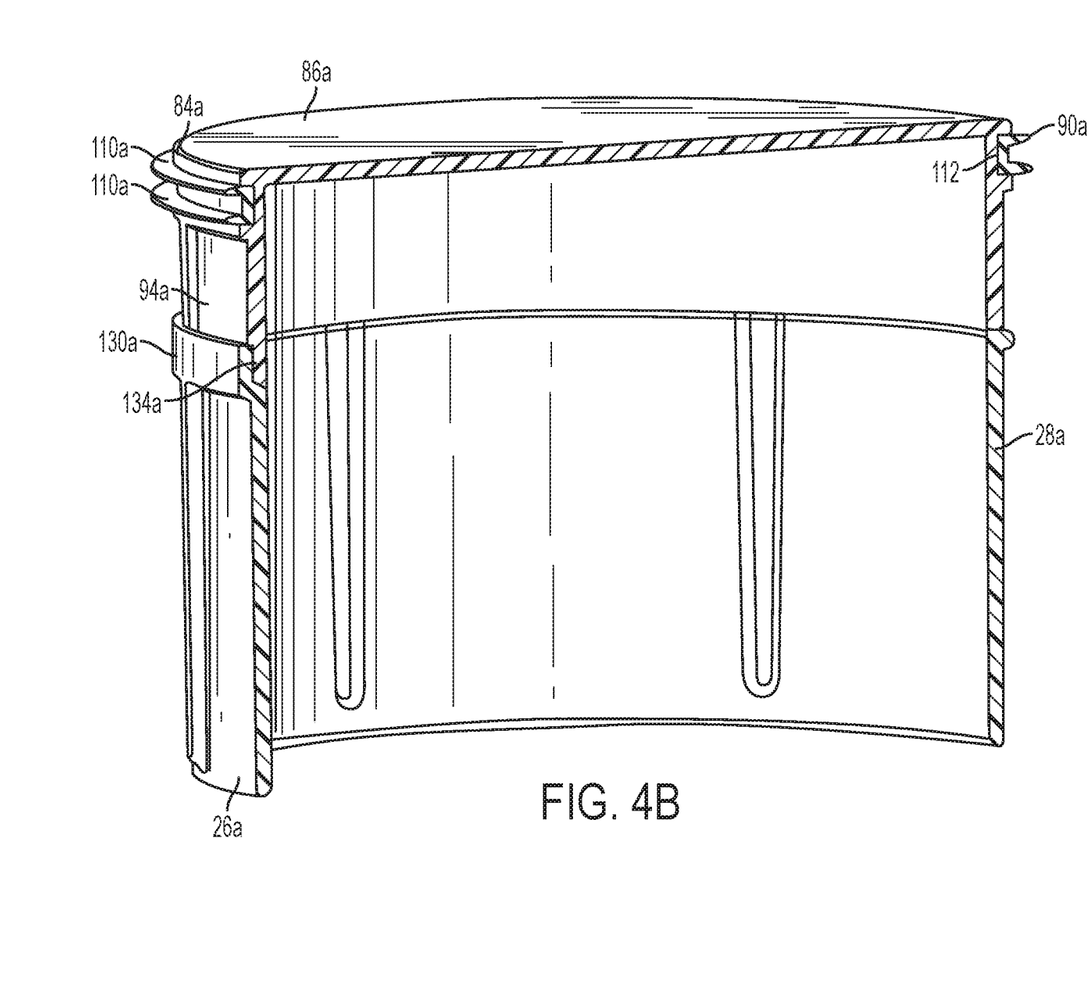
FIG. 4B is an unexploded crosssectional view taken along line 4B-4B in FIG. 4A.

In other embodiments, the wiper seals 110 can be in the form of a ring positioned within a peripheral track formed in the main body 84. Referring to FIGS. 4A and 4B, for example, rather than the previously described seal 90, a track or groove 112 located near the surface 86a of an alternative body 84a receives a circumferential seal ring 90a with wiper seals 110a and constructed of any material suitable for sealing.

In additional embodiments, the seal 90 may include one or more O-rings received in corresponding grooves formed in the piston 22. Alternatively, any other means for creating a seal between the piston 22 and the receptacle 14 may be employed, for example a "w" type seal, "u" type seal, a square cross section seal, or a single broad band retained in an indented space. The seal 90 is made of a resilient material, such as silicone or rubber.

The engaging member 26 forms a hollow cylindrical body 118 having a first end 122 and a second end 126. A plurality of projections 130 extends from the first end 122 of the body 118. The projections 130 are sized and shaped to be received by corresponding recesses 134 of the receiving portion 94 of the piston 22. Axially-extending strips or ridges 138 are disposed around the perimeter of the engaging member 26, corresponding with the ridges 98 on the receiving portion 94 of the piston 22. The ridges 138 project radially to define contact surfaces 142 for contact with the inside surface of the receptacle 14 and are tapered toward the second end 126. As illustrated in FIG. 2, the contact surfaces 142 may also include a friction-enhancing material, coating or surface treatment to increase the friction between the engaging portion 26 and the receptacle 14. Referring again to FIGS. 4A and 4B, projections 130a of an alternative base 26a may be radially offset from the base wall 28a and configured to cooperate with corresponding recessed portions 134a of a receiving portion 94a in a "tongue and groove" manner.

Figure 5:
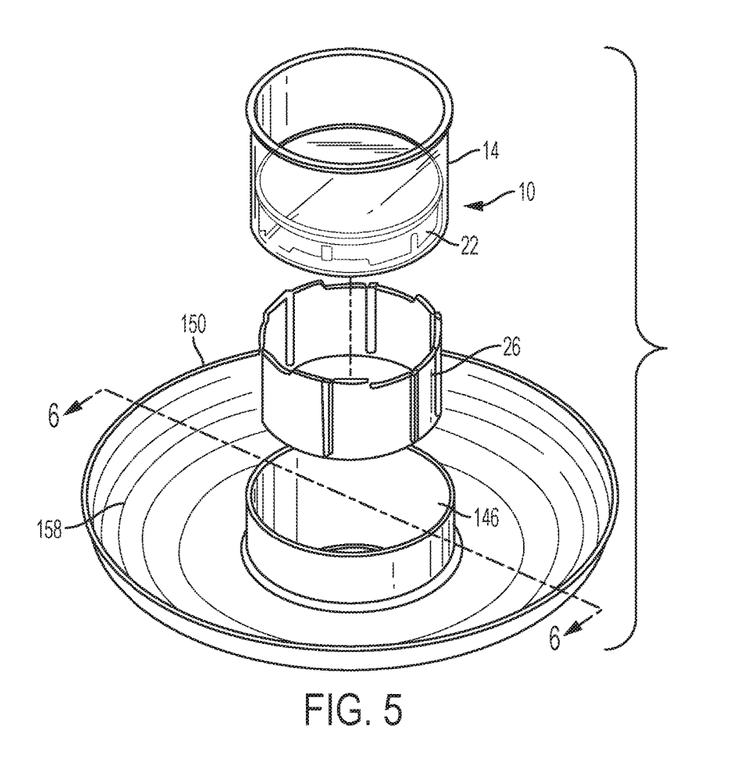
FIG. 5 is an exploded view of the food storage container of FIG. 1 incorporated into a serving tray.
Figure 6:
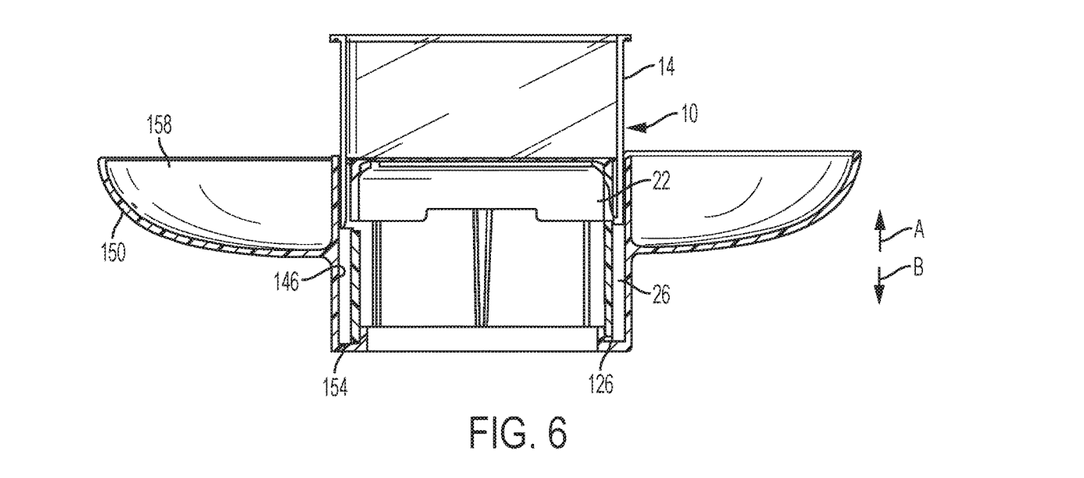
FIG. 6 is a cross-sectional view of the food storage container of FIG. 1 incorporated into a serving tray.

FIGS. 5 and 6 illustrate the container 10 of FIG. 1 positioned within a central bore 146 of a serving tray 150. The central bore 146 has an annular bottom wall 154 on which the container 10 is supported and surrounded by a bowl portion 158 suitable for accommodating chips or other items that may complement the food product 144 stored within the container 10.

To actuate the piston 22 when the container 10 is disposed within the serving tray 150, the receptacle 14 is pushed downward in the direction of arrow B. The second end 126 of the engaging member 26 bears against the bottom wall 154 of the tray 150 to move the piston 22 towards the upper end 38 of the receptacle 14.

With reference to FIG. 1, the receptacle 14, upper surface 108, and lid 18 together define a food storage chamber 114 with a resulting volume. As described in greater detail below, the piston 22 is displaceable within the receptacle 14 to vary the volume in order to remove excess air from around a food product 144 stored within the container 10 (FIGS. 7-10).

Figure 7:
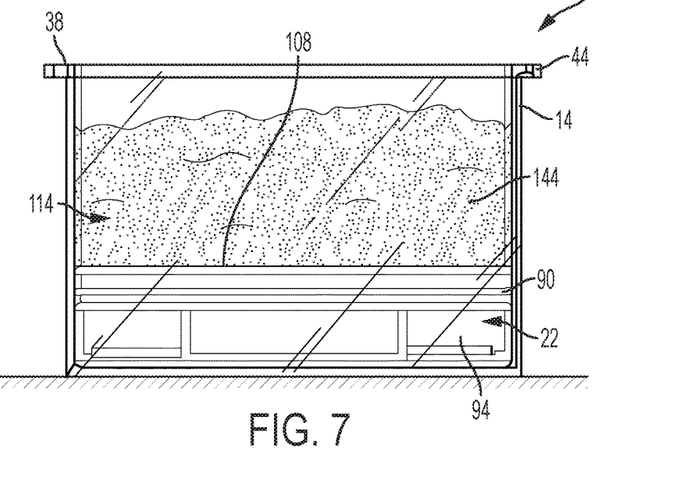
FIGS. 7-10 illustrate operation of the food storage container of FIG. 1.

Referring to FIGS. 7-10, in operation, a user places the food product 144 into the food storage chamber 114 on top of the upper surface 108 (FIG. 7). The user next places the lid 18 on the first end 38 of the receptacle 14 and engages the latches 46 to secure the lid 18 (FIG. 8) such that the lid 18 forms a substantially air-tight seal with the first end 38. The cap 66 remains disengaged from the vent 62.

Figure 8:
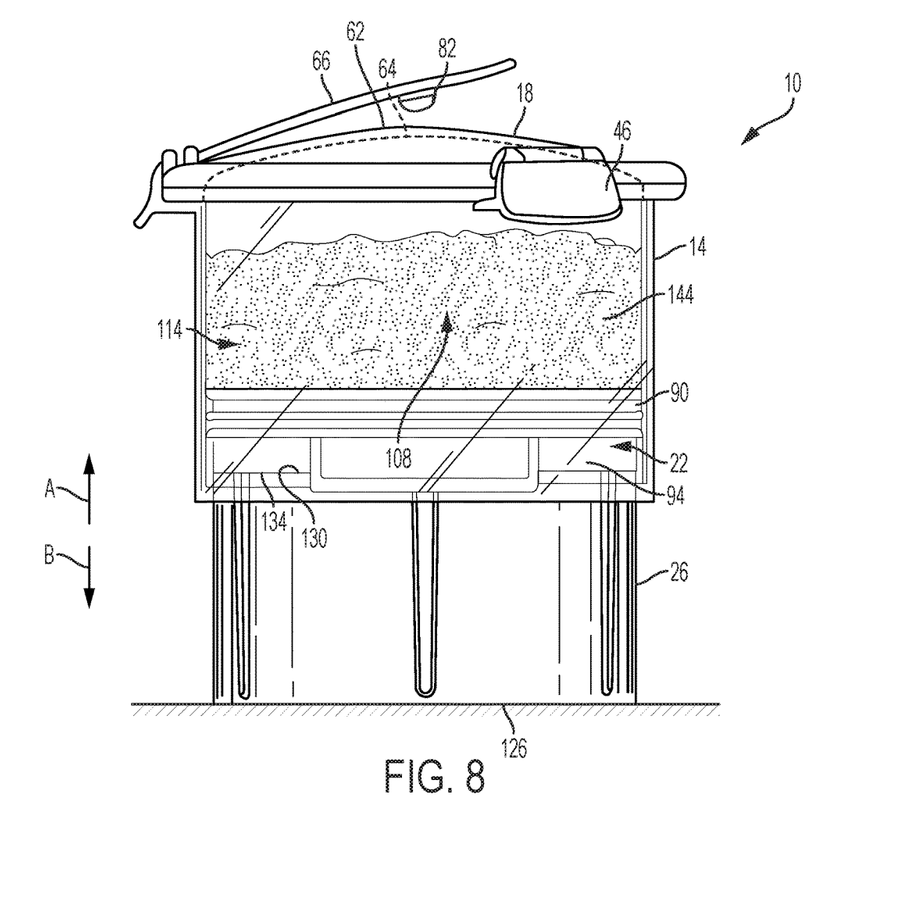
Figure 9:
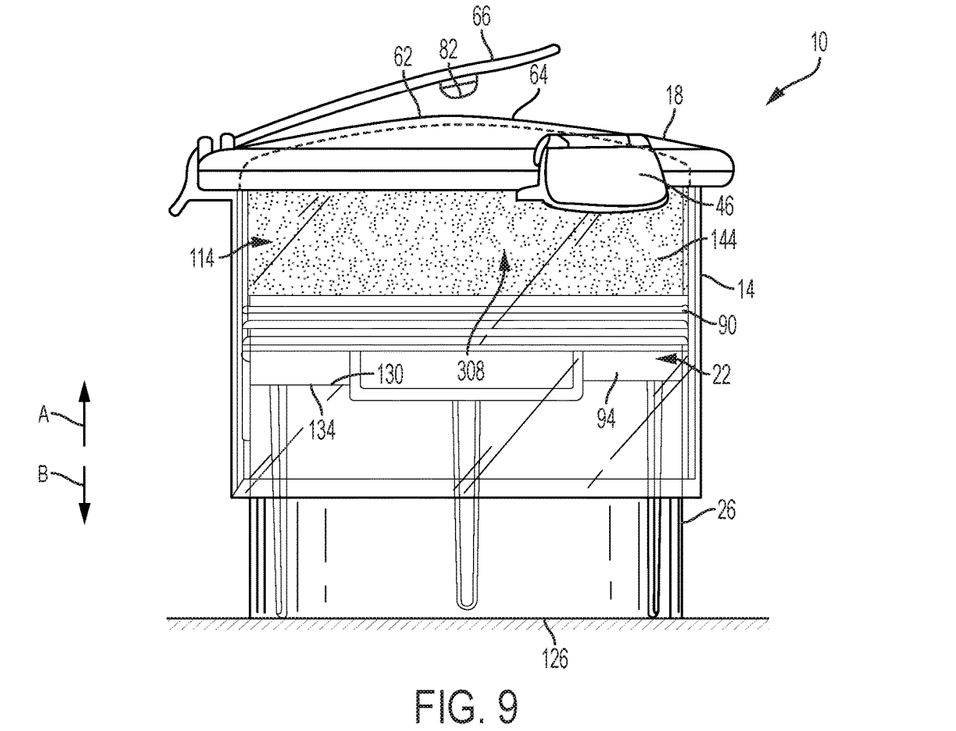

The engaging member 26 is inserted through the second end 42 of the receptacle 14 and the projections 130 are aligned with the recesses 134 to interconnect or interlock the engaging member 26 and the piston 22. When engaged with the piston 22, the second end 126 of the engaging member extends beyond the second end 42 of the receptacle 14. Accordingly, the engaging member 26 is now configured to be pushed in the direction of arrow A to actuate the piston 22 (i.e. to move the piston 22 toward the lid 18). Alternatively, the engaging member 26 may be positioned on a stationary surface, and the receptacle 14 may be pushed downward toward that surface in the direction of arrow B.

With the vent 62 open, the user pushes on the engaging member 26 in the direction of arrow A (or pushes down on the receptacle 14 in the direction of arrow B), causing the engaging member 26 and the piston 22 to move together toward the lid 18 (FIG. 9), with the circumferential seal 90 creating a seal between the outer periphery of the piston 22 and the inside surface of the receptacle 14. As a result of this relative movement, the volume of the food storage chamber 114 is reduced and excess air above the food product 144 is discharged through the vent 62. Due to the frictional engagement between the inside surface of the receptacle 14 and the contact surface 102, wipers 110, and/or friction-enhancing portions 106 (if present), upon ceasing sliding movement of the piston 22 within the receptacle 14, the piston 22 is held in position even in the absence of user assistance.

Figure 10:
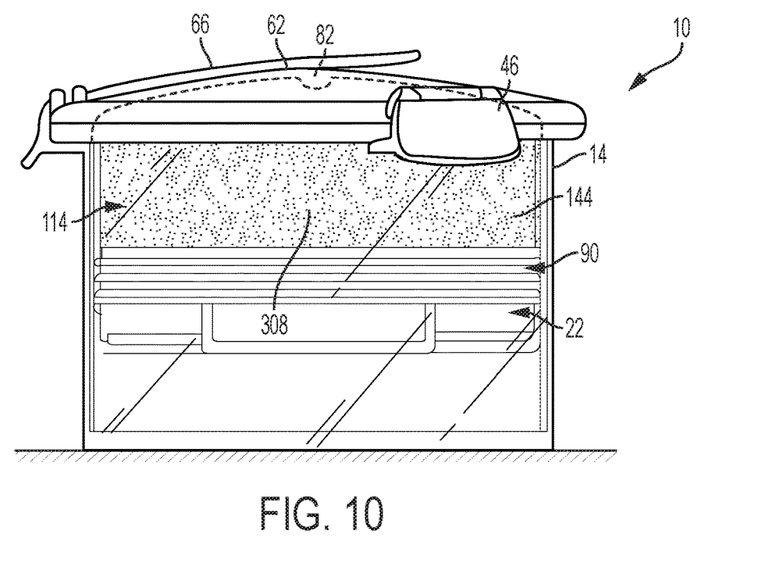

The user continues moving the piston 22 toward the lid 18 until the food product 144 contacts the lid 18, and preferably until the food product reaches the apex 64 of the lid 18. At this point, as a result of the curved or rounded shape of the lid 18 and the placement of the vent 62, virtually all of the excess air has been displaced from the food storage chamber 114. The user closes the vent 62 by pivoting the cap 66 to the closed position, which seals the food product 144 within the container 10 (FIG. 10). If desired, the engaging member 26 can be disengaged from the piston 22 and removed through the second end 42 of the receptacle 14.

FIGS. 11-15 illustrate a container 210 according to another embodiment. This embodiment comprises much of the same structure and features as the embodiment described above in connection with FIGS. 1-10. Accordingly, the following description focuses primarily upon the structure and features that are different from the embodiment of FIGS. 1-10 and reference should be made to the description above in connection with FIGS. 1-10 for additional information and possible alternatives to the structure and features of the container 210. Elements of the container 210 that are the same as or similar to elements of the container 10 described with regard to FIGS. 1-10 are assigned reference numerals based on the reference numerals for FIGS. 1-10 plus 200.

Figure 11:
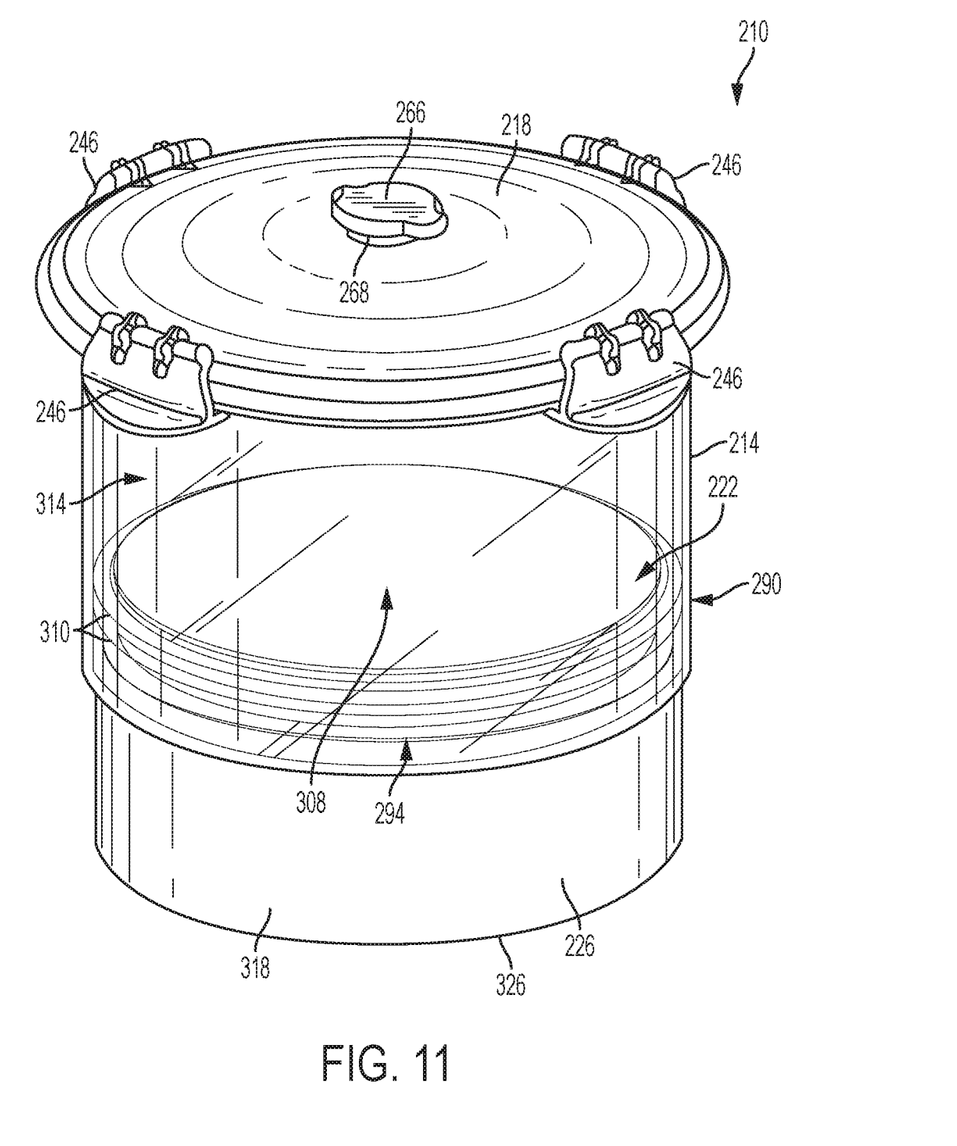
FIG. 11 is a perspective view of a food storage container according to yet another embodiment of the invention.

Like the container 10, the container 210 includes a receptacle 214, a lid 218, a plunger or piston 222, and a base or engaging member 226. The lid 218 is removably coupled to a first or upper end 238 of the receptacle 214 by a plurality of latches 246 positioned around the periphery of the lid 218. In the illustrated embodiment, the lid 218 includes four equally-spaced latches 246.

Figure 13:
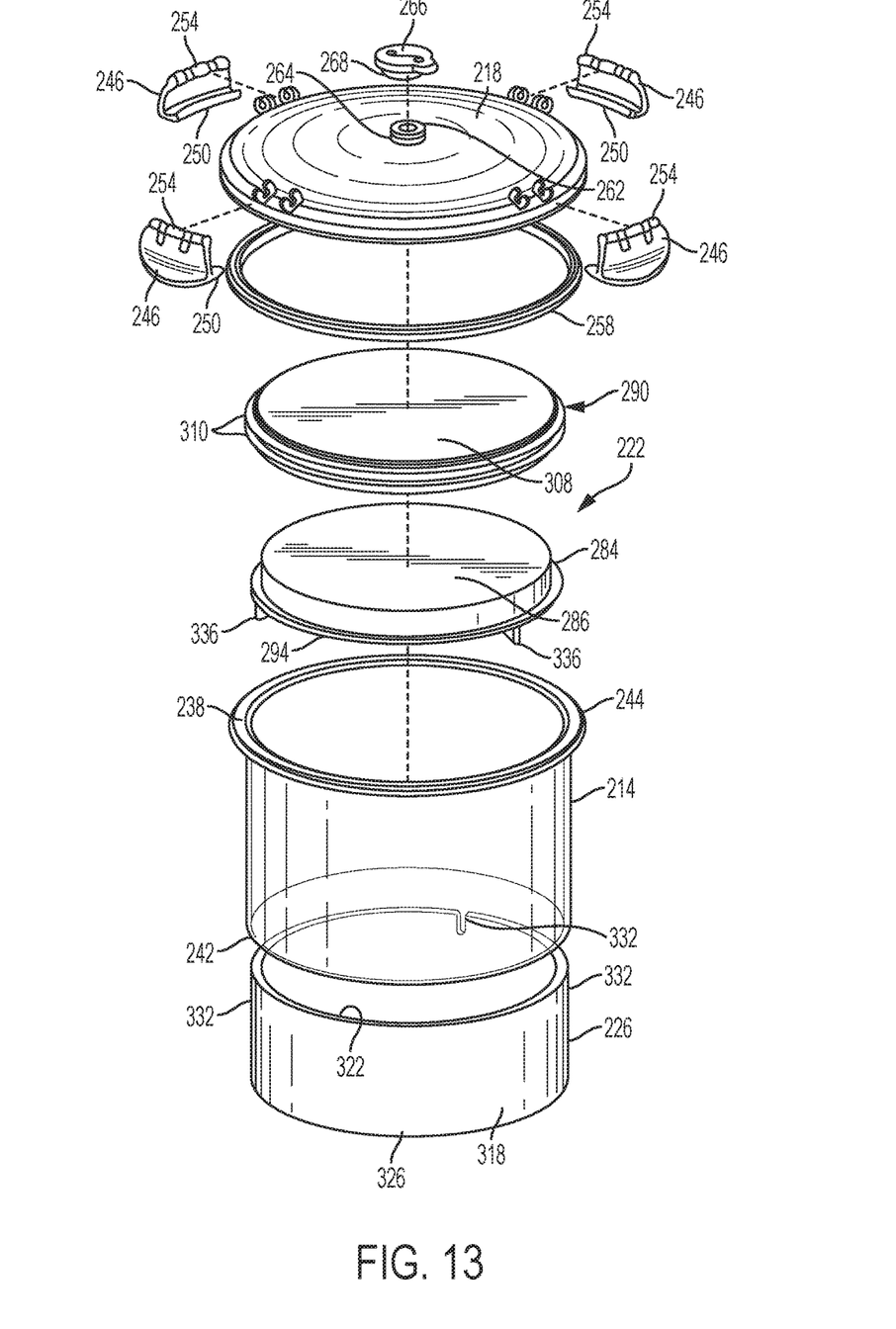
FIG. 13 is an exploded view of the food storage container of FIG. 11.
Figure 15:
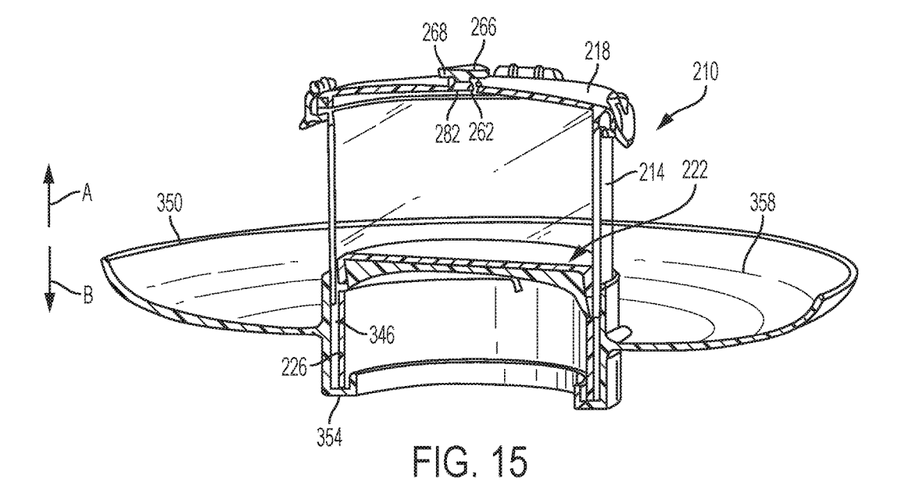
FIG. 15 is a cross-sectional view of the food storage container of FIG. 11 incorporated into a serving tray.

With reference to FIG. 13, the lid 218 is similarly curved or rounded. A vent 262 is centrally located at an apex 264 of the lid 18, and a "snap" cap 266 is provided to selectively seal the vent 262. The cap 266 includes a retaining ring 268 surrounding the vent 262 to retain the cap 266 with the lid 218. A plug 282 on the cap 266 is insertable into the vent 262 to seal the vent 262 (FIG. 15).

The piston 222 is slidably disposed within the receptacle 214 and includes a main body 284 having an upper surface 286, a peripheral seal 290, and a lower portion 294 opposite the upper surface 286.

Figure 12:
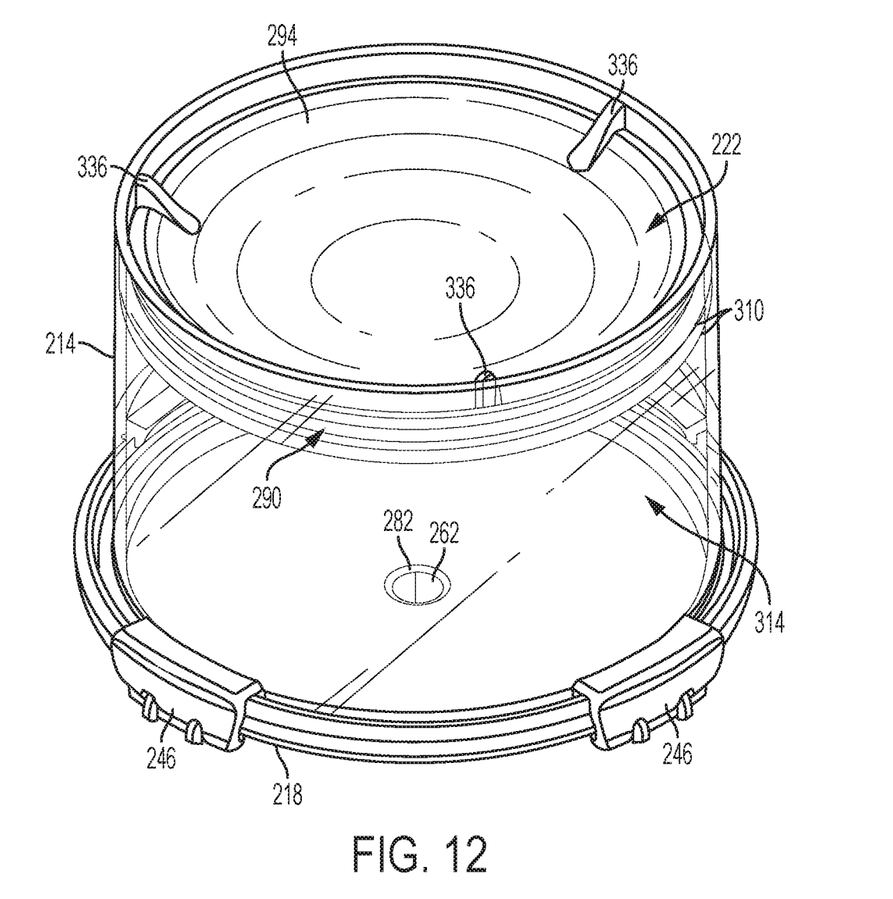
FIG. 12 is another perspective view of the food storage container of FIG. 11.

The engaging member 226 forms a hollow cylindrical body 318 having a first end 322, a second end 326, and a plurality of slots or notches 332 located in the first end 322. The notches 332 are sized and shaped to receive corresponding pins 336 located on the lower portion 294 of the piston 222, as shown in FIG. 12.

Operation of the container 210 is substantially similar to the operation of the container 10 as described above with reference to FIGS. 7-10. When engaged with the piston 222, the second end 326 of the engaging member 226 extends beyond the second end 242 of the receptacle 214 and can be pushed in the direction of arrow A to move the piston 222 toward the lid 218. Alternatively, the engaging member 226 may be positioned on a stationary surface, and the receptacle 214 may be pushed downward toward the surface in the direction of arrow B. Once the air has been expelled from the volume, the cap 266 is positioned to seal the food product within the container 210.

Figure 14:
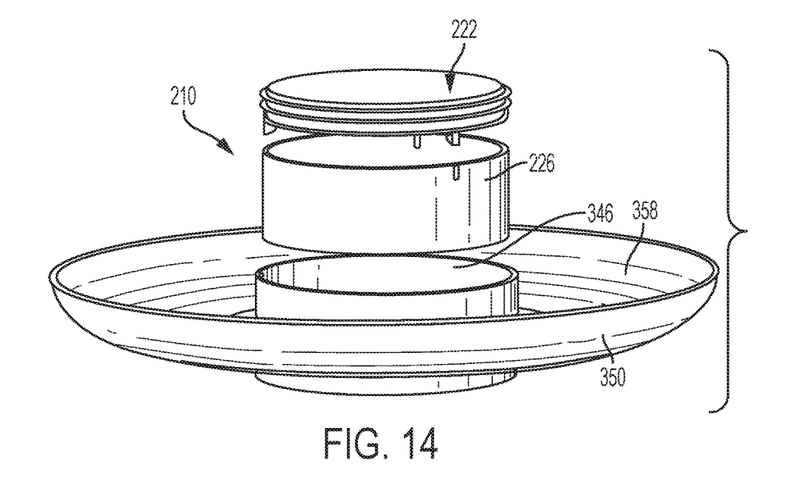
FIG. 14 is an exploded view of the food storage container of FIG. 11 incorporated into a serving tray.

FIGS. 14 and 15 illustrate the container 210 of FIG. 11 accommodated within a central bore 346 of a serving tray 350, in which the central bore 346 has an annular bottom wall 354 on which the container 10 is supported and surrounded by a bowl portion 358.

To actuate the piston 222 when the container 210 is disposed within the serving tray 350, the receptacle 214 is pushed downward in the direction of arrow B. The second end 326 of the engaging member 226 bears against the bottom wall 354 of the tray 350 to move the piston 222 towards the upper end 238 of the receptacle 214.

Various features of the invention are set forth in the following claims.

What is claimed is:

1. A container for preserving the freshness of a stored food product, the container comprising:
   a generally cylindrical receptacle having a first open end, an opposing second open end and an inner diameter;
   a piston having an upper surface and an exterior diameter that is slightly less than the interior diameter of the generally cylindrical receptacle to allow for placement of the piston within the generally cylindrical receptacle to form a food storage chamber of variable volume;
   a seal comprising an upper support surface and a peripheral wiper seal that protrudes co-planar with the upper support surface where the seal covers the piston and creates a generally air and liquid tight seal between the exterior diameter of the piston and the interior diameter of the generally cylindrical receptacle;
   a generally cylindrical engaging member having an exterior diameter that is less than the interior diameter of the generally cylindrical receptacle and that removably engages with the piston to move the piston in the generally cylindrical receptacle in order to vary the volume of the formed food storage chamber;
   a lid that is removably securable to the first open end of the generally cylindrical receptacle; and
   a vent located on the lid.

2. The container for preserving the freshness of a stored food product as recited in claim 1, wherein the lid further comprises an annular sealing ring to form an air and liquid tight seal between the lid and the generally cylindrical receptacle.

3. The container for preserving the freshness of a stored food product as recited in claim 1, wherein the generally cylindrical receptacle further comprises a peripheral flange at the first open end of the generally cylindrical receptacle.

4. The container for preserving the freshness of a stored food product as recited in claim 1, wherein the lid further comprises a plurality of latches positioned around the periphery of the lid.

5. The container for preserving the freshness of a stored food product as recited in claim 3, wherein the lid further comprises a plurality of latches and wherein each of the latches includes a hook portion for engaging with the peripheral flange of the generally cylindrical receptacle when securing the lid to the generally cylindrical receptacle.

6. The container for preserving the freshness of a stored food product as recited in claim 1, wherein the upper support surface is a soft durometer material that conforms to the piston.

7. The container for preserving the freshness of a stored food product as recited in claim 1, wherein the lid includes a curved portion, and wherein the vent is centrally located at an apex of the curved portion.

8. The container for preserving the freshness of a stored food product as recited in claim 7, further comprising a cap engageable with the vent to selectively seal the vent.

9. The container for preserving the freshness of a stored food product as recited in claim 8, wherein the cap is pivotally coupled to the lid.

10. The container for preserving the freshness of a stored food product as recited in claim 8, wherein the cap is configured as a lever that is pivotally coupled to the lid.

11. The container for preserving the freshness of a stored food product as recited in claim 1, wherein the peripheral wiper seal is formed with the upper support surface.

12. A container for preserving the freshness of a stored food product, the container comprising:
   a generally cylindrical receptacle having a first open end, an opposing second open end and an inner diameter;
   a piston having an upper surface and an exterior diameter that is slightly less than the interior diameter of the generally cylindrical receptacle to allow for placement of the piston within the generally cylindrical receptacle to form a food storage chamber of variable volume;
   a seal comprising an upper support surface and a peripheral wiper seal that protrudes co-planar with the upper support surface where the seal covers the piston and creates a generally air and liquid tight seal between the exterior diameter of the piston and the interior diameter of the generally cylindrical receptacle;
   a generally cylindrical engaging member having an exterior diameter that is less than the interior diameter of the generally cylindrical receptacle and that removably engages with the piston to move the piston in the generally cylindrical receptacle in order to vary the volume of the formed food storage chamber;
   a generally cylindrical lid comprising a curved portion;
   the generally cylindrical lid configured to be removably securable to the first open end of the generally cylindrical receptacle; and
   a vent located on the generally cylindrical lid and centrally located at an apex of the curved portion of the generally cylindrical lid.

13. The container for preserving the freshness of a stored food product as recited in claim 12, wherein the lid further comprises an annular sealing ring to form an air and liquid tight seal between the lid and the generally cylindrical receptacle.

14. The container for preserving the freshness of a stored food product as recited in claim 12, wherein the generally cylindrical receptacle further comprises a peripheral flange at the first open end of the generally cylindrical receptacle.

15. The container for preserving the freshness of a stored food product as recited in claim 12, wherein the lid further comprises a plurality of latches positioned around the periphery of the lid.

16. The container for preserving the freshness of a stored food product as recited in claim 14, wherein the lid further comprises a plurality of latches and wherein each of the latches includes a hook portion for engaging with the peripheral flange of the generally cylindrical receptacle when securing the lid to the generally cylindrical receptacle.

17. The container for preserving the freshness of a stored food product as recited in claim 12, wherein the removable upper support surface is a soft durometer material that conforms to the piston.

18. The container for preserving the freshness of a stored food product as recited in claim 12, wherein the peripheral wiper seal is formed with the upper support surface.

19. A kit for creating a container for preserving the freshness of a stored food product, the kit comprising:
   a generally cylindrical receptacle having a first open end, an opposing second open end and an inner diameter;
   a piston having an upper surface and an exterior diameter that is slightly less than the interior diameter of the generally cylindrical receptacle to allow for placement of the piston within the generally cylindrical receptacle to form a food storage chamber of variable volume;
   a seal capable of removably covering the piston, the seal comprising an upper support surface and a peripheral wiper seal that protrudes co-planar with the upper support surface where the seal creates a generally air and liquid tight seal between the exterior diameter of the piston and the interior diameter of the generally cylindrical receptacle when placed therein;
   a generally cylindrical engaging member having an exterior diameter that is less than the interior diameter of the generally cylindrical receptacle and that removably engages with the piston to move the piston in the generally cylindrical receptacle in order to vary the volume a formed food storage chamber; and
   a lid configured to be removably securable to the first open end of the generally cylindrical receptacle.

20. The kit for creating a container for preserving the freshness of a stored food product as recited in claim 19, wherein the lid has a sealable vent.

* * * * *